(No Model.)
D. M. SMYTH.
CULTIVATOR FOR FRUIT TREES.
No. 505,965.                                   Patented Oct. 3, 1893.
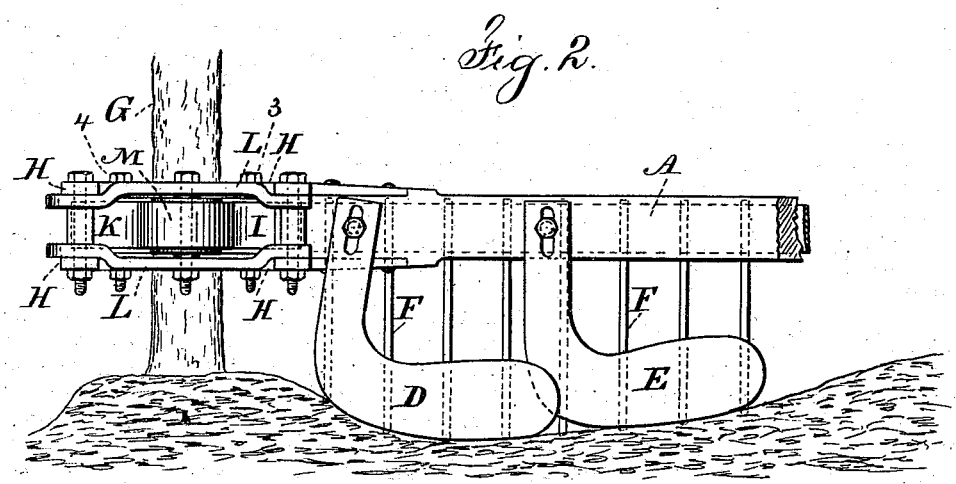
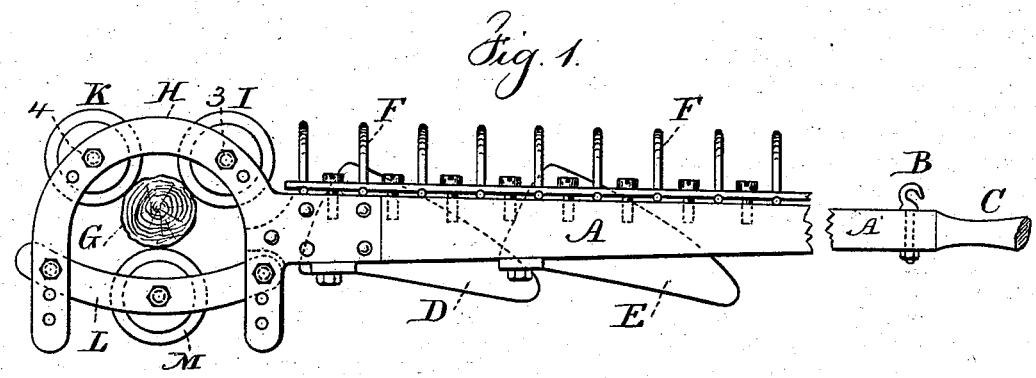
Witnesses
Chas. H. Smith
J. Staib
Inventor
David M. Smyth
per Lemuel W. Serrell
Atty.

UNITED STATES PATENT OFFICE.

DAVID M. SMYTH, OF NORTHWOOD, NEW HAMPSHIRE.

CULTIVATOR FOR FRUIT-TREES.

SPECIFICATION forming part of Letters Patent No. 505,965, dated October 3, 1893.

Application filed July 11, 1892. Serial No. 439,679. (No model.)

*To all whom it may concern:*

Be it known that I, DAVID M. SMYTH, a citizen of the United States, residing at Northwood, in the county of Rockingham and State of New Hampshire, have invented an Improvement in Plow-Cultivators for Fruit-Trees, of which the following is a specification.

In the cultivation of fruit trees, especially in places where irrigation is resorted to, the earth around the fruit trees requires to be cultivated and freed from weeds, and it also requires to be hollowed out or made basin shape for holding the water with which the land is irrigated. Devices have heretofore been proposed for this purpose, but they are liable to injure the tree or to be heavy and cumbersome in use.

In my present improvements I provide a beam to which the cultivator plows and rake teeth are connected, and at the end of such beam there are elastic rollers adapted to press against the surface of the tree, so that the tree becomes a guide and the rubber rollers do not in any manner injure the surface of the bark.

In the drawings Figure 1 is a plan view representing my improvement, and Fig. 2 is an elevation thereof.

The beam A is adapted to the reception of a horse or horses at one end, there being a loop or ring B near one end to which the whiffle trees can be connected, and the handle C at the end of the beam allows for the same being moved by hand when necessary. Upon this beam and below the same the cultivator plows D E are connected, and there are spring teeth F also connected to the beam, and preferably in front of the plows D E, which spring fingers act as rake teeth for raking off the surface of the ground, and the plows D and E are shaped in such a manner that the earth is passed toward the outer rim of the basin that is produced in the earth around the tree.

The tree is represented at G, and there is a yoke H upon the inner end of the beam A provided with india rubber rollers I K, and there is a cross bearer L carrying a roller M, and it is advantageous to make the yoke H double, so that the rollers I and K may be received between the parts of such yoke, and the pivot pins or axles 3, 4 of the rollers I K may be varied in position to adapt the apparatus to different sizes of tree trunks, and the cross bar L and its roller M may be set up against the tree after the yoke has been passed around the same. It will now be understood that by moving this implement around the tree, either by hand or by horse power, the surface of the earth is loosened and scraped outwardly to form a basin, and at the same time the rake teeth serve to smooth the surface and leave the same in the desired condition.

I claim as my invention—

1. The combination with the beam A, of the cultivator-plows D E and rake teeth F, and the yoke H adapted to pass around the tree, and the rubber rollers bearing against such tree as the cultivating implement is drawn around the same, substantially as set forth.

2. The combination with the beam, the cultivator-plows and the rake teeth, of a yoke adapted to pass around the tree, and india rubber rollers supported by such yoke, and a movable cross bar or roller for resting against the tree and steadying the implement while the same is drawn around the tree for cultivating the surface of the earth, substantially as set forth.

Signed by me this 30th day of June, 1892.

DAVID M. SMYTH.

Witnesses:
  W. H. LEWIS,
  R. G. FESSENDEN.